(12) United States Patent
Wray et al.

(10) Patent No.: US 12,503,133 B2
(45) Date of Patent: Dec. 23, 2025

(54) SYSTEM AND METHOD FOR VEHICLE GAMIFICATION

(71) Applicant: Nissan North America, Inc., Franklin, TN (US)

(72) Inventors: Kyle Hollins Wray, Mountain View, CA (US); Erik Stayton, San Jose, CA (US); Stefan Witwicki, San Carlos, CA (US)

(73) Assignee: Nissan North America, Inc., Franklin, TN (US)

( * ) Notice: Subject to any disclaimer, the term of this patent is extended or adjusted under 35 U.S.C. 154(b) by 209 days.

(21) Appl. No.: 17/186,805

(22) Filed: Feb. 26, 2021

(65) Prior Publication Data

US 2022/0274623 A1    Sep. 1, 2022

(51) Int. Cl.
*B60W 60/00* (2020.01)
*B60W 50/06* (2006.01)
*G07C 5/08* (2006.01)

(52) U.S. Cl.
CPC .......... *B60W 60/001* (2020.02); *B60W 50/06* (2013.01); *G07C 5/0816* (2013.01)

(58) Field of Classification Search
CPC .... B60W 60/001; B60W 50/06; G07C 5/0816
See application file for complete search history.

(56) References Cited

U.S. PATENT DOCUMENTS

| | | | |
|---|---|---|---|
| 11,946,760 B2* | 4/2024 | Wray | G01C 21/3807 |
| 2016/0117928 A1* | 4/2016 | Hodges | G06F 3/04842 |
| | | | 701/99 |
| 2017/0098231 A1* | 4/2017 | Dietrich | H04W 4/046 |
| 2020/0141748 A1* | 5/2020 | Krysiuk | G01C 21/3492 |
| 2020/0151611 A1* | 5/2020 | McGavran | H04W 4/40 |
| 2021/0031793 A1 | 2/2021 | Stayton et al. | |
| 2021/0200801 A1* | 7/2021 | Agrawal | G06F 16/219 |
| 2021/0241610 A1* | 8/2021 | Nepomuceno | G08G 1/164 |

* cited by examiner

*Primary Examiner* — Kito R Robinson
*Assistant Examiner* — Roy Rhee
(74) *Attorney, Agent, or Firm* — Young Basile Hanlon & MacFarlane, P.C.

(57) ABSTRACT

Systems and methods are provide an incentive for a driver to improve power systems, safety systems, and autonomous driving systems of a vehicle. A method includes determining a learning goal for the vehicle. The method includes generating a request based on the learning goal. The method includes calculating a reward value. The method includes displaying a task on a user interface of the vehicle. The task may be based on the request, the reward value, or both. The method includes obtaining sensor data. The sensor data may be obtained based on an initiation of the task. The method includes determining progress of the task. The method includes transmitting a notification based on a determination that the task is completed.

20 Claims, 6 Drawing Sheets

SYSTEM AND METHOD FOR VEHICLE GAMIFICATION

TECHNICAL FIELD

This disclosure relates to vehicle subsystem optimization, including autonomous vehicle operational management and autonomous driving.

BACKGROUND

A vehicle, such as an autonomous vehicle, can traverse a portion of a vehicle transportation network. Traversing the vehicle transportation network includes generating or capturing, such as by a sensor of the vehicle, data representing an operational state of the vehicle. This data may be used for localization of the vehicle within the vehicle transportation network.

Vehicle control systems are programmed to perform scenario-specific actions. In the real world, however, it is impossible to predict every possible scenario and code corresponding solutions for every possible scenario into the autonomous vehicle system. To do so would take countless hours and teams of engineers to code every scenario and/or problem into the autonomous vehicle system. It would be desirable to have vehicle control systems and methods to provide an incentive for a driver to improve power systems, safety systems, and autonomous driving systems.

SUMMARY

Disclosed herein are aspects, features, elements, implementations, and embodiments for vehicle subsystem optimization.

In an aspect, a method for use in a vehicle may include determining a learning goal for the vehicle. The method may include generating a request based on the learning goal. The method may include calculating a reward value. The method may include displaying a task on a user interface of the vehicle. The task may be based on the request, the reward value, or both. The method may include obtaining sensor data. The sensor data may be obtained based on an initiation of the task. The method may include determining progress of the task. The method may include transmitting a notification based on a determination that the task is completed.

In one or more aspects, the method may include transmitting a progress notification. The progress notification may be based on the determined progress. In one or more aspects, the notification or the progress notification may be an audible alert, a visual alert, a haptic alert, or any combination thereof. In one or more aspects, the visual alert may include a text alert on a user interface of the vehicle, a graphical alert on the user interface of the vehicle, a change in a lighting condition of an interior of the vehicle, or any combination thereof. In one or more aspects, the haptic alert may include haptic feedback from a steering wheel of the vehicle, a seat of the vehicle, an accelerator pedal of the vehicle, a brake pedal of the vehicle, or any combination thereof. In one or more aspects, the method may include correlating the sensor data with the learning goal. In one or more aspects, the method may include updating a navigation map based on the sensor data when the learning goal is based on a navigation map. In one or more aspects, updating the navigation map may include updating a traffic pattern, a traffic speed, a road topology, a lane topology, a battery consumption amount, a driver attribute, an ambient noise value, or any combination thereof. In one or more aspects, the reward value may be based on the learning goal. In one or more aspects, the task may include a driving instruction, a number of repetitions, a duration of time, a battery consumption threshold, an ambient noise threshold, or any combination thereof.

In another aspect, a vehicle may include a processor, a user interface, and one or more sensors. The processor may be configured to determine a learning goal for the vehicle. The processor may be configured to generate a request. The request may be based on the learning goal. The processor may be configured to calculate a reward value. The user interface may be configured to display a task. The task may be based on the request, the reward value, or both. The one or more sensors may be configured to obtain data. The data may be obtained based on an initiation of the task. The processor may be further configured to determine progress of the task. The processor may be further configured to transmit a notification based on a determination that the task is completed.

In one or more aspects, the processor may be configured to transmit a progress notification based on the determined progress. In one or more aspects, the processor may be configured to correlate the sensor data with the learning goal.

Variations in these and other aspects, features, elements, implementations, and embodiments of the methods, apparatus, procedures, and algorithms disclosed herein are described in further detail hereafter.

BRIEF DESCRIPTION OF THE DRAWINGS

The various aspects of the methods and apparatuses disclosed herein will become more apparent by referring to the examples provided in the following description and drawings in which like reference numbers refer to like elements unless otherwise noted.

DETAILED DESCRIPTION

Figure 1:
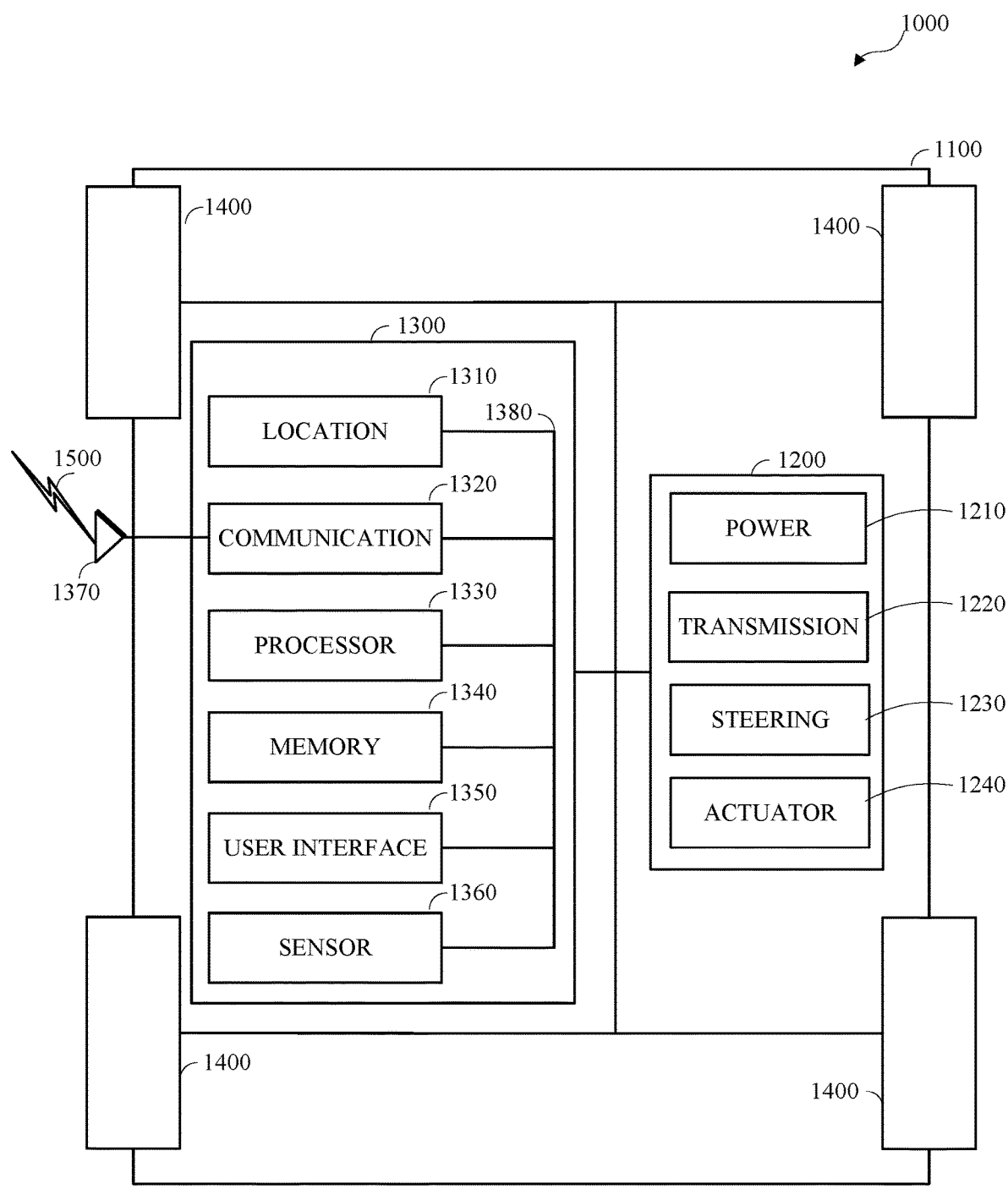
FIG. 1 is a diagram of an example of a vehicle in which the aspects, features, and elements disclosed herein may be implemented.

A vehicle, such as an autonomous vehicle, or a semi-autonomous vehicle, may traverse a portion of a vehicle transportation network. The vehicle may include one or more sensors and traversing the vehicle transportation network may include the sensors generating or capturing sensor data for use in traversing the vehicle transportation network. Sensor data may include vehicle operational information, such as global positioning system (GPS) coordinates, whether the vehicle is moving or in a fixed position, a vehicle heading, etc. Sensor data may also include information corresponding to the operational environment of the vehicle, such as information corresponding to one or more external objects, such as pedestrians, remote vehicles, other objects within the vehicle operational environment, vehicle transportation network geometry or topology, internal ambient noise, environmental noise, or a combination thereof. This information may be referred to herein as operational environment information.

The autonomous vehicle may include an autonomous vehicle operational management system, which may include one or more operational environment monitors that may process operational environment information, such as the sensor data, for the autonomous vehicle. The operational management system may include a learning monitor that may determine probability of a vehicle control action based on a stored observation of the operational environment.

Autonomous vehicles are programmed to perform scenario-specific actions. In the real world, however, it is impossible to predict every possible scenario and code corresponding solutions for every possible scenario into the autonomous vehicle system. To do so would take countless hours and teams of engineers to code every scenario and/or problem into the autonomous vehicle system.

Typical vehicle control systems fail to provide an incentive for the driver to improve power systems, safety systems, autonomous driving systems, or any combination thereof. For example, a power system that is configured to draw power from an electric power source, such as a battery, and a gas power source may be improved with an accurate navigation map where new cities, roads, lanes, traffic patterns, battery consumption amounts, and ambient noises are known. In this example, the vehicle control system may provide an incentive to the driver to explore unknown areas or perform certain tasks to obtain sensor data from one or more sensors of the vehicle. The sensor data may be used to update the navigation map and optimize power consumption.

In another example, a safety system may be associated with a one-pedal driving mode where releasing the accelerator automatically activates a regenerative braking system, thereby avoiding the need to activate a brake pedal. The safety system may be improved with knowledge of the lane topology in new areas, knowledge associated with the behavior of a new driver, or both. In this example, the vehicle control system may provide an incentive to the driver to explore unknown areas or perform certain tasks to obtain sensor data from one or more sensors of the vehicle. The sensor data may be used to update the lane topology, new driver behavior, or both, to optimize safety.

In another example, an autonomous driving system may build a high definition (HD) map to learn one or more decision components from new experiences. In this example, the vehicle control system may provide an incentive to the driver to explore areas of a standard definition (SD) map in order to build an HD map. The vehicle control system may obtain sensor data from one or more sensors of the vehicle to update the SD map to build the HD map.

The embodiments disclosed herein describe systems, methods, and vehicles configured to gain experience by incentivizing drivers to perform certain tasks as the vehicle traverses a vehicle transportation network. The systems, methods, and vehicles are configured to proactively learn by performing specific targeted learning requests. Incentivizing drivers may promote safer driving by motivating drivers to maintain the speed limit and avoid aggressive driving behaviors. Incentives may include daily, weekly, or monthly objectives. For example, a driver may be incentivized to improve upon the previous day's efficiency, find a more energy efficient route, or perform a trip with a lower level of ambient noise. Sensor data from the vehicle may be obtained as the tasks are performed. The sensor data may be incorporated into a model in the form of learning to improve the model over time. The models may be used to customize solutions for specific intersections, locations of merges, pedestrian crosswalks, drivers, traffic patterns, and the like.

Although described herein with reference to an autonomous vehicle, the methods and apparatus described herein may be implemented in any vehicle capable of autonomous, semi-autonomous, or manual operation. Although described with reference to a vehicle transportation network, the method and apparatus described herein may include the autonomous vehicle operating in any area navigable by the vehicle.

FIG. 1 is a diagram of an example of a vehicle in which the aspects, features, and elements disclosed herein may be implemented. In the embodiment shown, a vehicle 1000 includes a chassis 1100, a powertrain 1200, a controller 1300, and wheels 1400. Although the vehicle 1000 is shown as including four wheels 1400 for simplicity, any other propulsion device or devices, such as a propeller or tread, may be used. In FIG. 1, the lines interconnecting elements, such as the powertrain 1200, the controller 1300, and the wheels 1400, indicate that information, such as data or control signals, power, such as electrical power or torque, or both information and power, may be communicated between the respective elements. For example, the controller 1300 may receive power from the powertrain 1200 and may communicate with the powertrain 1200, the wheels 1400, or both, to control the vehicle 1000, which may include accelerating, decelerating, steering, or otherwise controlling the vehicle 1000.

The powertrain 1200 shown by example in FIG. 1 includes a power source 1210, a transmission 1220, a steering unit 1230, and an actuator 1240. Any other element or combination of elements of a powertrain, such as a suspension, a drive shaft, axles, or an exhaust system may also be included. Although shown separately, the wheels 1400 may be included in the powertrain 1200.

The power source 1210 includes an engine, a battery, or a combination thereof. The power source 1210 may be any device or combination of devices operative to provide energy, such as electrical energy, thermal energy, or kinetic energy. In an example, the power source 1210 includes an engine, such as an internal combustion engine, an electric motor, or a combination of an internal combustion engine and an electric motor, and is operative to provide kinetic energy as a motive force to one or more of the wheels 1400. Alternatively or additionally, the power source 1210 includes a potential energy unit, such as one or more dry cell batteries, such as nickel-cadmium (NiCd), nickel-zinc (NiZn), nickel metal hydride (NiMH), lithium-ion (Li-ion); solar cells; fuel cells; or any other device capable of providing energy.

The transmission 1220 receives energy, such as kinetic energy, from the power source 1210, and transmits the energy to the wheels 1400 to provide a motive force. The transmission 1220 may be controlled by the controller 1300, the actuator 1240, or both. The steering unit 1230 controls the wheels 1400 to steer the vehicle and may be controlled by the controller 1300, the actuator 1240, or both. The actuator 1240 may receive signals from the controller 1300 and actuate or control the power source 1210, the transmission 1220, the steering unit 1230, or any combination thereof to operate the vehicle 1000.

In the illustrated embodiment, the controller 1300 includes a location unit 1310, an electronic communication unit 1320, a processor 1330, a memory 1340, a user interface 1350, a sensor 1360, and an electronic communication interface 1370. Fewer of these elements may exist as part of the controller 1300. Although shown as a single unit, any one or more elements of the controller 1300 may be integrated into any number of separate physical units. For example, the user interface 1350 and the processor 1330 may be integrated in a first physical unit and the memory 1340 may be integrated in a second physical unit. Although not shown in FIG. 1, the controller 1300 may include a power source, such as a battery. Although shown as separate elements, the location unit 1310, the electronic communication unit 1320, the processor 1330, the memory 1340, the user interface 1350, the sensor 1360, the electronic communication interface 1370, or any combination thereof may be integrated in one or more electronic units, circuits, or chips.

The processor 1330 may include any device or combination of devices capable of manipulating or processing a signal or other information now-existing or hereafter developed, including optical processors, quantum processors, molecular processors, or a combination thereof. For example, the processor 1330 may include one or more special purpose processors, one or more digital signal processors, one or more microprocessors, one or more controllers, one or more microcontrollers, one or more integrated circuits, one or more Application Specific Integrated Circuits, one or more Field Programmable Gate Array, one or more programmable logic arrays, one or more programmable logic controllers, one or more state machines, or any combination thereof. The processor 1330 is operatively coupled with one or more of the location unit 1310, the memory 1340, the electronic communication interface 1370, the electronic communication unit 1320, the user interface 1350, the sensor 1360, and the powertrain 1200. For example, the processor may be operatively coupled with the memory 1340 via a communication bus 1380.

The memory 1340 includes any tangible non-transitory computer-usable or computer-readable medium, capable of, for example, containing, storing, communicating, or transporting machine readable instructions, or any information associated therewith, for use by or in connection with any processor, such as the processor 1330. The memory 1340 may be, for example, one or more solid state drives, one or more memory cards, one or more removable media, one or more read-only memories, one or more random access memories, one or more disks, including a hard disk, a floppy disk, an optical disk, a magnetic or optical card, or any type of non-transitory media suitable for storing electronic information, or any combination thereof. For example, a memory may be one or more read only memories (ROM), one or more random access memories (RAM), one or more registers, low power double data rate (LPDDR) memories, one or more cache memories, one or more semiconductor memory devices, one or more magnetic media, one or more optical media, one or more magneto-optical media, or any combination thereof.

The communication interface 1370 may be a wireless antenna, as shown, a wired communication port, an optical communication port, or any other wired or wireless unit capable of interfacing with a wired or wireless electronic communication medium 1500. Although FIG. 1 shows the communication interface 1370 communicating via a single communication link, a communication interface may be configured to communicate via multiple communication links. Although FIG. 1 shows a single communication interface 1370, a vehicle may include any number of communication interfaces.

The communication unit 1320 is configured to transmit or receive signals via a wired or wireless electronic communication medium 1500, such as via the communication interface 1370. Although not explicitly shown in FIG. 1, the communication unit 1320 may be configured to transmit, receive, or both via any wired or wireless communication medium, such as radio frequency (RF), ultraviolet (UV), visible light, fiber optic, wireline, or a combination thereof. Although FIG. 1 shows a single communication unit 1320 and a single communication interface 1370, any number of communication units and any number of communication interfaces may be used. In some embodiments, the communication unit 1320 includes a dedicated short range communications (DSRC) unit, an on-board unit (OBU), or a combination thereof.

The location unit 1310 may determine geolocation information, such as longitude, latitude, elevation, direction of travel, or speed, of the vehicle 1000. In an example, the location unit 1310 includes a GPS unit, such as a Wide Area Augmentation System (WAAS) enabled National Marine-Electronics Association (NMEA) unit, a radio triangulation unit, or a combination thereof. The location unit 1310 can be used to obtain information that represents, for example, a current heading of the vehicle 1000, a current position of the vehicle 1000 in two or three dimensions, a current angular orientation of the vehicle 1000, or a combination thereof.

The user interface 1350 includes any unit capable of interfacing with a person, such as a virtual or physical keypad, a touchpad, a display, a touch display, a heads-up display, a virtual display, an augmented reality display, a haptic display, a feature tracking device, such as an eye-tracking device, a speaker, a microphone, a video camera, a sensor, a printer, or any combination thereof. The user interface 1350 may be operatively coupled with the processor 1330, as shown, or with any other element of the controller 1300. Although shown as a single unit, the user interface 1350 may include one or more physical units. For example, the user interface 1350 may include both an audio interface for performing audio communication with a person and a touch display for performing visual and touch-based communication with the person. The user interface 1350 may include multiple displays, such as multiple physically separate units, multiple defined portions within a single physical unit, or a combination thereof.

The sensors 1360 are operable to provide information that may be used to control the vehicle. The sensors 1360 may be an array of sensors. The sensors 1360 may provide information regarding current operating characteristics of the vehicle 1000, including vehicle operational information. The sensors 1360 can include, for example, a speed sensor, acceleration sensors, a steering angle sensor, traction-related sensors, braking-related sensors, steering wheel position sensors, eye tracking sensors, seating position sensors, or any sensor, or combination of sensors, that are operable to report information regarding some aspect of the current dynamic situation of the vehicle 1000.

The sensors 1360 include one or more sensors that are operable to obtain information regarding the physical environment surrounding the vehicle 1000, such as operational environment information. For example, one or more sensors may detect road geometry, such as lane lines, and obstacles, such as fixed obstacles, vehicles, and pedestrians. The sensors 1360 can be or include one or more video cameras, laser-sensing systems, infrared-sensing systems, acoustic-sensing systems, or any other suitable type of on-vehicle environmental sensing device, or combination of devices, now known or later developed. In some embodiments, the sensors 1360 and the location unit 1310 are combined.

Although not shown separately, the vehicle 1000 may include a trajectory controller. For example, the controller 1300 may include the trajectory controller. The trajectory controller may be operable to obtain information describing a current state of the vehicle 1000 and a route planned for the vehicle 1000, and, based on this information, to determine and optimize a trajectory for the vehicle 1000. In some embodiments, the trajectory controller may output signals operable to control the vehicle 1000 such that the vehicle 1000 follows the trajectory that is determined by the trajectory controller. For example, the output of the trajectory controller can be an optimized trajectory that may be supplied to the powertrain 1200, the wheels 1400, or both. In some embodiments, the optimized trajectory can be control inputs such as a set of steering angles, with each steering angle corresponding to a point in time or a position. In some embodiments, the optimized trajectory can be one or more paths, lines, curves, or a combination thereof.

One or more of the wheels 1400 may be a steered wheel that is pivoted to a steering angle under control of the steering unit 1230, a propelled wheel that is torqued to propel the vehicle 1000 under control of the transmission 1220, or a steered and propelled wheel that may steer and propel the vehicle 1000.

Although not shown in FIG. 1, a vehicle may include additional units or elements not shown in FIG. 1, such as an enclosure, a Bluetooth® module, a frequency modulated (FM) radio unit, a Near Field Communication (NFC) module, a liquid crystal display (LCD) display unit, an organic light-emitting diode (OLED) display unit, a speaker, or any combination thereof.

The vehicle 1000 may be an autonomous vehicle that is controlled autonomously, without direct human intervention, to traverse a portion of a vehicle transportation network. Although not shown separately in FIG. 1, an autonomous vehicle may include an autonomous vehicle control unit that performs autonomous vehicle routing, navigation, and control. The autonomous vehicle control unit may be integrated with another unit of the vehicle. For example, the controller 1300 may include the autonomous vehicle control unit.

When present, the autonomous vehicle control unit may control or operate the vehicle 1000 to traverse a portion of the vehicle transportation network in accordance with current vehicle operation parameters. The autonomous vehicle control unit may control or operate the vehicle 1000 to perform a defined operation or maneuver, such as parking the vehicle. The autonomous vehicle control unit may generate a route of travel from an origin, such as a current location of the vehicle 1000, to a destination based on vehicle information, environment information, vehicle transportation network information representing the vehicle transportation network, or a combination thereof, and may control or operate the vehicle 1000 to traverse the vehicle transportation network in accordance with the route. For example, the autonomous vehicle control unit may output the route of travel to the trajectory controller to operate the vehicle 1000 to travel from the origin to the destination using the generated route.

Figure 2:
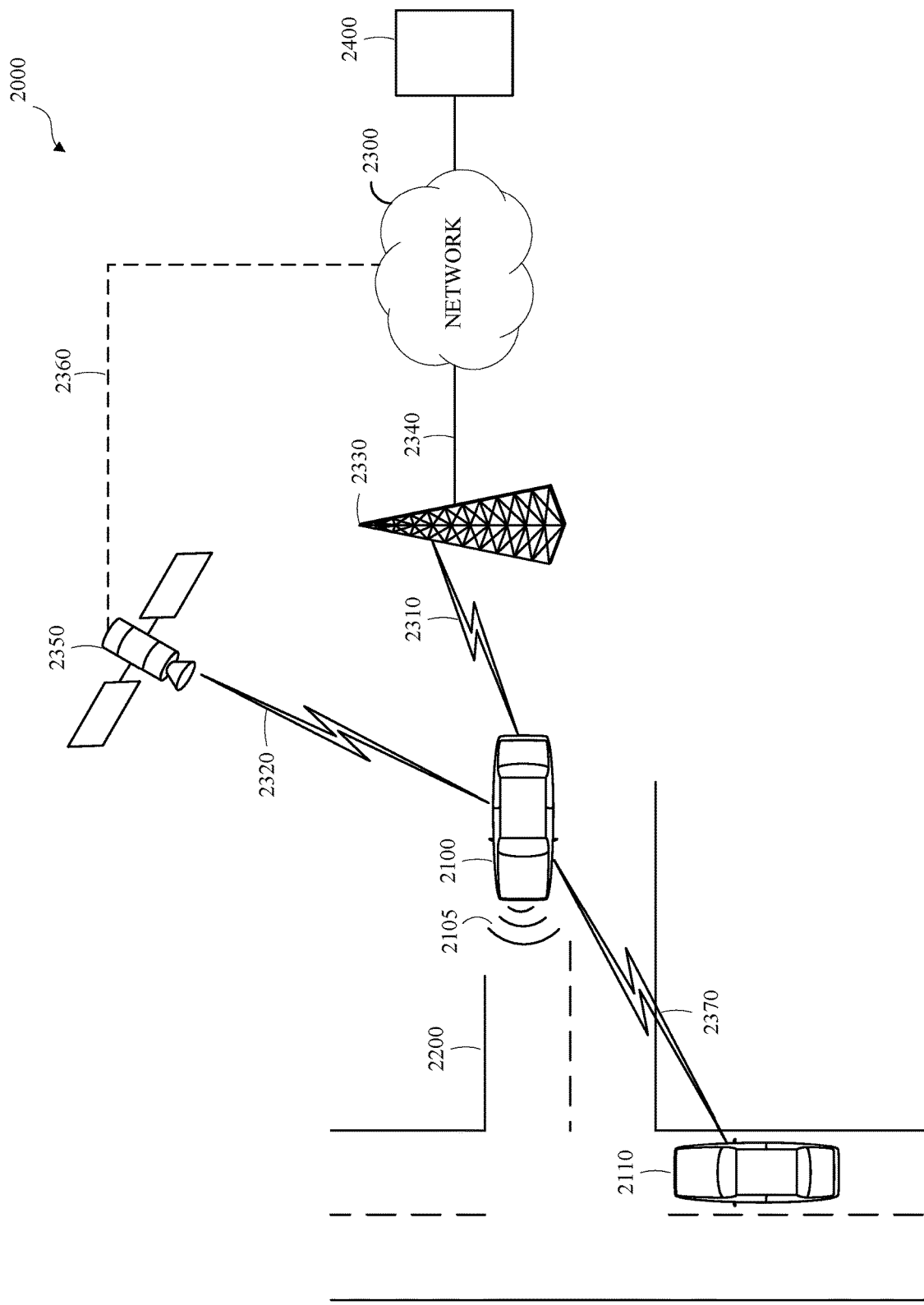
FIG. 2 is a diagram of an example of a portion of a vehicle transportation and communication system in which the aspects, features, and elements disclosed herein may be implemented.

FIG. 2 is a diagram of an example of a portion of a vehicle transportation and communication system in which the aspects, features, and elements disclosed herein may be implemented. The vehicle transportation and communication system 2000 may include one or more vehicles 2100/2110, such as the vehicle 1000 shown in FIG. 1, which travels via one or more portions of the vehicle transportation network 2200, and communicates via one or more electronic communication networks 2300. Although not explicitly shown in FIG. 2, a vehicle may traverse an off-road area.

The electronic communication network 2300 may be, for example, a multiple access system that provides for communication, such as voice communication, data communication, video communication, messaging communication, or a combination thereof, between the vehicle 2100/2110 and one or more communication devices 2400. For example, a vehicle 2100/2110 may receive information, such as information representing the vehicle transportation network 2200, from a communication device 2400 via the network 2300.

In some embodiments, a vehicle 2100/2110 may communicate via a wired communication link (not shown), a wireless communication link 2310/2320/2370, or a combination of any number of wired or wireless communication links. As shown, a vehicle 2100/2110 communicates via a terrestrial wireless communication link 2310, via a non-terrestrial wireless communication link 2320, or via a combination thereof. The terrestrial wireless communication link 2310 may include an Ethernet link, a serial link, a Bluetooth link, an infrared (IR) link, an ultraviolet (UV) link, or any link capable of providing for electronic communication.

A vehicle 2100/2110 may communicate with another vehicle 2100/2110. For example, a host, or subject, vehicle (HV) 2100 may receive one or more automated inter-vehicle messages, such as a basic safety message (BSM), from a remote, or target, vehicle (RV) 2110, via a direct communication link 2370, or via a network 2300. The remote vehicle 2110 may broadcast the message to host vehicles within a defined broadcast range, such as 300 meters. In some embodiments, the host vehicle 2100 may receive a message via a third party, such as a signal repeater (not shown) or another remote vehicle (not shown). A vehicle 2100/2110 may transmit one or more automated inter-vehicle messages periodically, based on, for example, a defined interval, such as 100 milliseconds.

Automated inter-vehicle messages may include vehicle identification information, geospatial state information, such as longitude, latitude, or elevation information, geospatial location accuracy information, kinematic state information, such as vehicle acceleration information, yaw rate information, speed information, vehicle heading information, braking system status information, throttle information, steering wheel angle information, or vehicle routing information, or vehicle operating state information, such as vehicle size information, headlight state information, turn signal information, wiper status information, transmission information, or any other information, or combination of information, relevant to the transmitting vehicle state. For example, transmission state information may indicate whether the transmission of the transmitting vehicle is in a neutral state, a parked state, a forward state, or a reverse state.

The vehicle 2100 may communicate with the communications network 2300 via an access point 2330. The access point 2330, which may include a computing device, is configured to communicate with a vehicle 2100, with a communication network 2300, with one or more communication devices 2400, or with a combination thereof via wired or wireless communication links 2310/2340. For example, the access point 2330 may be a base station, a base transceiver station (BTS), a Node-B, an enhanced Node-B (eNode-B), a Home Node-B (HNode-B), a wireless router, a wired router, a hub, a relay, a switch, or any similar wired or wireless device. Although shown as a single unit here, an access point may include any number of interconnected elements.

The vehicle 2100 may communicate with the communications network 2300 via a satellite 2350, or other non-terrestrial communication device. The satellite 2350, which may include a computing device, is configured to communicate with a vehicle 2100, with a communication network 2300, with one or more communication devices 2400, or with a combination thereof via one or more communication links 2320/2360. Although shown as a single unit here, a satellite may include any number of interconnected elements.

An electronic communication network 2300 is any type of network configured to provide for voice, data, or any other type of electronic communication. For example, the electronic communication network 2300 may include a local area network (LAN), a wide area network (WAN), a virtual private network (VPN), a mobile or cellular telephone network, the Internet, or any other electronic communication system. The electronic communication network 2300 uses a communication protocol, such as the transmission control protocol (TCP), the user datagram protocol (UDP), the internet protocol (IP), the real-time transport protocol (RTP) the HyperText Transport Protocol (HTTP), or a combination thereof. Although shown as a single unit here, an electronic communication network may include any number of interconnected elements.

The vehicle 2100 may identify a portion or condition of the vehicle transportation network 2200. For example, the vehicle includes at least one on-vehicle sensor 2105, like the sensors 1360 shown in FIG. 1, which may be or include a speed sensor, a wheel speed sensor, a camera, a gyroscope, an optical sensor, a laser sensor, a radar sensor, a sonic sensor, or any other sensor or device or combination thereof capable of determining or identifying a portion or condition of the vehicle transportation network 2200. The sensor data may include lane line data, remote vehicle location data, or both.

The vehicle 2100 may traverse a portion or portions of the vehicle transportation network 2200 using information communicated via the network 2300, such as information representing the vehicle transportation network 2200, information identified by one or more on-vehicle sensors 2105, or a combination thereof.

Although FIG. 2 shows one vehicle transportation network 2200, one electronic communication network 2300, and one communication device 2400, for simplicity, any number of networks or communication devices may be used. The vehicle transportation and communication system 2000 may include devices, units, or elements not shown in FIG. 2. Although the vehicle 2100 is shown as a single unit, a vehicle may include any number of interconnected elements.

Although the vehicle 2100 is shown communicating with the communication device 2400 via the network 2300, the vehicle 2100 may communicate with the communication device 2400 via any number of direct or indirect communication links. For example, the vehicle 2100 may communicate with the communication device 2400 via a direct communication link, such as a Bluetooth communication link.

Figure 3:
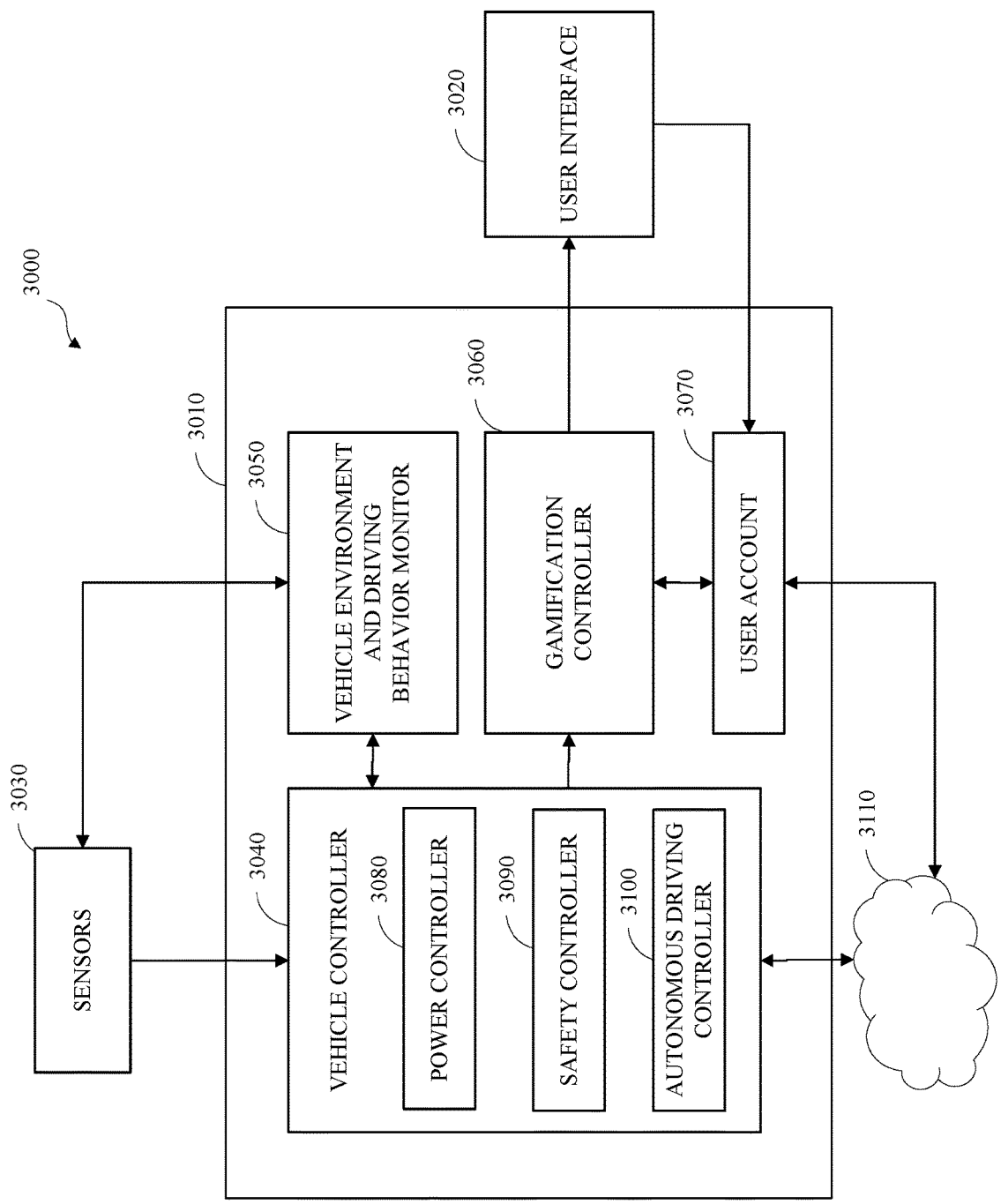
FIG. 3 is a diagram of an example of a gamification system for use in a vehicle in accordance with this disclosure.

FIG. 3 is a diagram of an example of a gamification system 3000 for use in a vehicle in accordance with this disclosure. The gamification system 3000 includes a processor 3010, user interface 3020, and sensors 3030. The processor 3010 may be processor 1330 as shown in FIG. 1. The user interface 3020 may be user interface 1350 shown in FIG. 1. The sensors 3030 may be sensor 1360 shown in FIG. 1.

As shown in FIG. 3, the processor 3010 includes a vehicle controller 3040, a vehicle environment and driving behavior (VEDB) monitor 3050, a gamification controller 3060, and a user account 3070.

The vehicle controller 3040 includes one or more artificial intelligence (AI) subsystems such as a power controller 3080, a safety controller 3090, and an autonomous driving controller 3100. Each of the power controller 3080, the safety controller 3090, and the autonomous driving controller 3100 may be configured to perform localized learning operations. The localized learning operations may include, for example, obtaining sensor data to update a navigation map to optimize power consumption, update the lane topology and/or new driver behavior to optimize safety, or update an SD map to build an HD map for improved autonomous driving capability.

As shown FIG. 3, the vehicle controller 3040 is configured to communicate with a network 3110. An example of the network 3110 may be the network 2300 shown in FIG. 2. The network 3110 may perform learning operations for multiple vehicles, for example in the case of a fleet of vehicles. The learning operations may include, for example, obtaining sensor data to update a navigation map to optimize power consumption, update the lane topology and/or new driver behavior to optimize safety, or update an SD map to build an HD map for improved autonomous driving capability. In some examples, the network 3110 may synchronize data from the user account 3070.

The vehicle controller 3040 is configured to determine a learning goal. In some examples, the learning goal may be determined by the network 3110. The learning goal may be based on incomplete, outdated or missing data that could be used to improve one or more AI subsystems of the vehicle. Example learning goals associated with the power controller 3080 may include driving on a specific nearby road a predetermined number of times or minimizing battery usage for a trip lasting longer than a predetermined duration of time or for a particular location. Example learning goals associated with the safety controller 3090 may include matching recommended speeds and driver decisions for a predetermined duration of time or performing a full stop for at least a predetermined number of stop lines. Example learning goals associated with the autonomous driving controller 3100 may include driving through a new traffic light intersection, performing a lane change on a specific road, interfacing with another vehicle at a 4-way stop, or traversing along the SD map on a small segment to learn a piece of an HD map. An example of a learning goal may be to obtain lane information, such as "Obtain lane lines on $2^{nd}$ Street." Another example of a learning goal may be to obtain a driver preference such as "Obtain driver acceleration preference." The vehicle controller 3040 is configured to generate a request based on the learning goal and transmit the request to the gamification controller 3060.

The gamification controller 3060 is configured to receive the request from the vehicle controller 3040. The gamification controller 3060 is configured to determine a task and calculate a reward value for the completion of the task. The task and reward value may be determined based on the request. An example task to obtain lane information may include an instruction to perform a driving action a predetermined number of times, such as "Drive $2^{nd}$ Street three times." An example task to obtain a driver preference may include an instruction to perform a driving action a predetermined number of times, such as "Accelerate onto a highway 6 times." The reward value may be calculated based on a priority. For example, a learning goal based on safety may be assigned a higher priority, and therefore a higher point value than a learning goal based on battery consumption. In this example, the learning goal based on safety may be assigned 100 points, whereas a learning goal based on battery consumption may be assigned 50 points. The gamification controller 3060 is configured to transmit the task and reward value to the user interface 3020 for display.

The user interface 3020 is configured to display the task and reward value. The user interface 3020 may be configured to receive an input from a user, for example, a touch or voice input from the user to accept the task. As the user performs the task, the VEDB monitor 3050 may monitor the vehicle environment and driving behavior using data obtained from the sensors 3030.

The gamification controller 3060 is configured to obtain sensor data from the sensors 3030. In some examples, the gamification controller 3060 may obtain the sensor data via the vehicle controller 3040. The gamification controller 3060 is configured to determine the task progress based on the obtained sensor data. If the sensor data indicates that the task is complete, the gamification controller 3060 transmits a notification to the user interface 3020. The notification may indicate that the task is complete, include the reward value, or both. The gamification controller 3060 may transmit the reward value to the user account 3070. The user account 3070 may store reward values as points, and accumulate points until they are used to unlock one or more features. Examples of the one or more features include, and are not limited to, customized colors for a dashboard, ambient light patterns such as "flowing" or "breathing" patterns, ambient light colors, customized sounds for the horn, reverse gear, door open alert, engine startup, or the like, or customizations to the user interface 3020 or one or more widgets thereof. The customizations may include themed packages, for example themed packages associated with third parties, such as, for example, movie production companies. In some examples, a user may earn rewards based on achievements to unlock unique upgrades that may not otherwise be available for purchase in a store. For example, "Drive 10,000 miles on country roads" may be a large-scale goal. In this example, the system may grant the user a badge, such as "The Explorer" that may be added to the customization interface. The reward may unlock a special theme that may not otherwise be purchased. The user interface 3020 may be used to display one or more features to unlock. The one or more features displayed may be based on a number of points stored in the user account 3070. A user may input an unlock request using the user interface 3020.

The user account 3070 is configured to receive the unlock request from the user interface 3020 and subtract the number of points associated with the feature. The user account 3070 is configured to transmit a notification to the gamification controller 3060 that indicates that the purchase is completed. The gamification controller 3060 is configured to transmit a notification to the user interface 3020 that indicates that the purchase is complete and that the one or more features is unlocked. The user interface 3020 is configured to display the notification that the purchase is complete and that the one or more features is unlocked.

Figure 4:
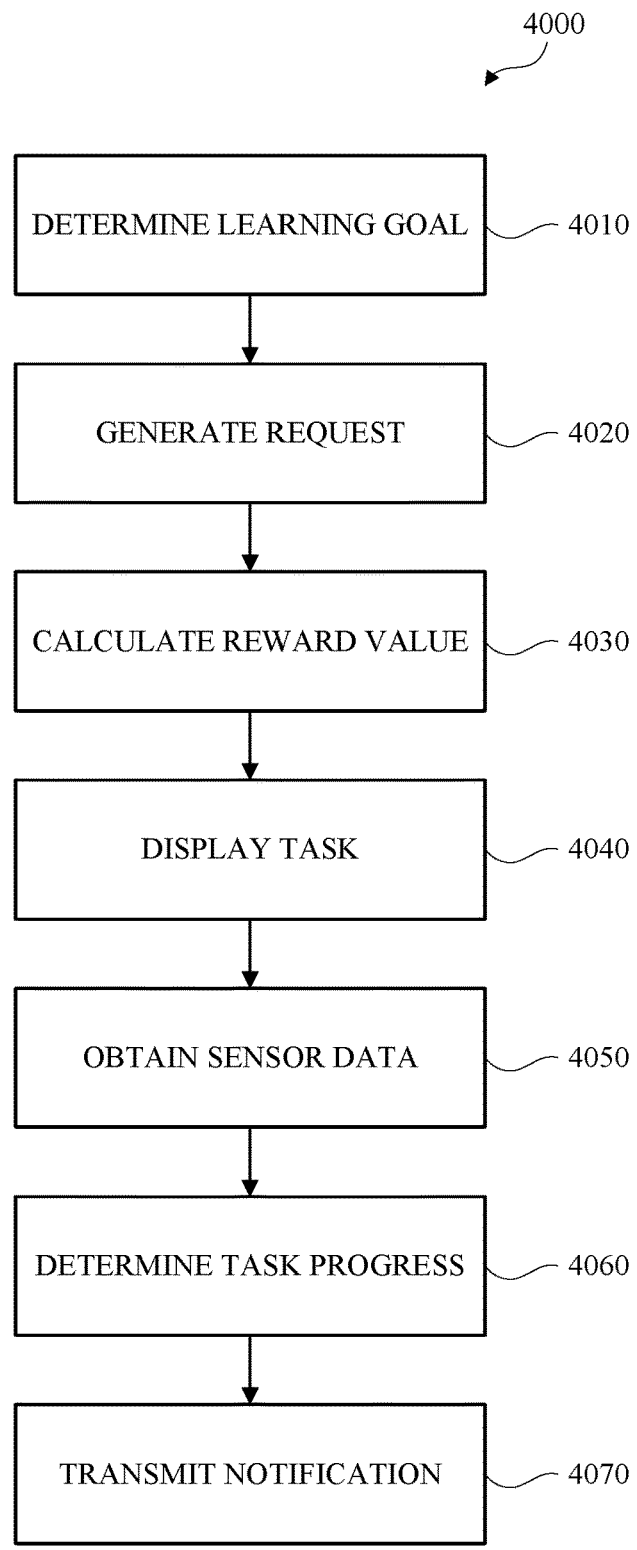
FIG. 4 is a flow diagram of an example of a gamification method for use in a vehicle in accordance with embodiments of this disclosure.

FIG. 4 is a flow diagram of an example of a gamification method 4000 for use in a vehicle in accordance with embodiments of this disclosure. The method 4000 may be performed by a vehicle such as vehicle 1000 shown in FIG. 1 or vehicles 2100 or 2110 shown in FIG. 2 using the gamification system 3000 shown in FIG. 3.

The method 4000 includes determining 4010 a learning goal. The learning goal may be based on incomplete or missing data that could be used to improve one or more AI subsystems of the vehicle. Example learning goals may be based on a navigation map to optimize power consumption, a lane topology and/or new driver behavior to optimize safety, an update to an SD map to build an HD map for improved autonomous driving capability, or any combination thereof. An example of a learning goal may be to obtain lane information, such as "Obtain lane lines on $2^{nd}$ Street." Another example of a learning goal may be to obtain a driver preference such as "Obtain driver acceleration preference."

The method 4000 includes generating 4020 a request for data collection. The request may be based on the learning goal. The request may be used to determine a task and calculate 4030 a reward value. The task may include a driving instruction, a number of repetitions, a duration of time, a battery consumption threshold, an ambient noise threshold, or any combination thereof. An example task to obtain lane information may include an instruction to perform a driving action a predetermined number of times, such as "Drive $2^{nd}$ Street three times." An example task to obtain a driver preference may include an instruction to perform a driving action a predetermined number of times, such as "Accelerate onto a highway 6 times." The reward value may be calculated based on a priority and map deficiency. For example, a learning goal based on safety may be assigned a higher priority, and therefore a higher point value than a learning goal based on battery consumption. In this example, the learning goal based on safety may be assigned 100 points, whereas a learning goal based on battery consumption may be assigned 50 points.

The method 4000 includes displaying 4040 the task, the reward value, or both, generated to address the map deficiency, on a user interface, such as user interface 3020 shown in FIG. 3. The method 4000 includes obtaining 4050 sensor data from one or more sensors, such as sensors 3030 shown in FIG. 3. In some examples, the method 4000 includes correlating the sensor data with the learning goal. The method 4000 includes determining 4060 the task progress based on the obtained sensor data. If the sensor data indicates that the task is complete, the method 4000 includes transmitting 4070 a notification. In some examples, the method 4000 may include transmitting a progress notification based on the initiation or determined progress. The notification, progress notification, or both, may be an audible alert, a visual alert, a haptic alert, or any combination thereof. In an example, a visual alert may be a text alert on the user interface of the vehicle, a graphical alert on the user interface of the vehicle, a change in a lighting condition of an interior of the vehicle, or any combination thereof. In another example, a haptic alert may include haptic feedback from a steering wheel of the vehicle, a seat of the vehicle, an accelerator pedal of the vehicle, a brake pedal of the vehicle, or any combination thereof. An example of haptic feedback may include automatically adjusting the sensitivity or resistance of the accelerator pedal, the brake pedal, or both, to encourage safe driving habits and discourage aggressive driving habits. For example, good behavior may be rewarded with lower pedal resistance, and bad behavior may result in increased pedal resistance. The notification derived from the sensor data may indicate that the task is complete, include the reward value, or both.

In an example where the learning goal is based on a navigation map, the method 5000 may include updating an AI subsystem of the vehicle based on the sensor data. Updating an AI subsystem of the vehicle may include, for example, updating a navigation map. In this example, updating the navigation map may include updating a traffic pattern, a traffic speed, a road topology, a lane topology, a battery consumption amount, a driver attribute, an ambient noise value, or any combination thereof.

Figure 5:
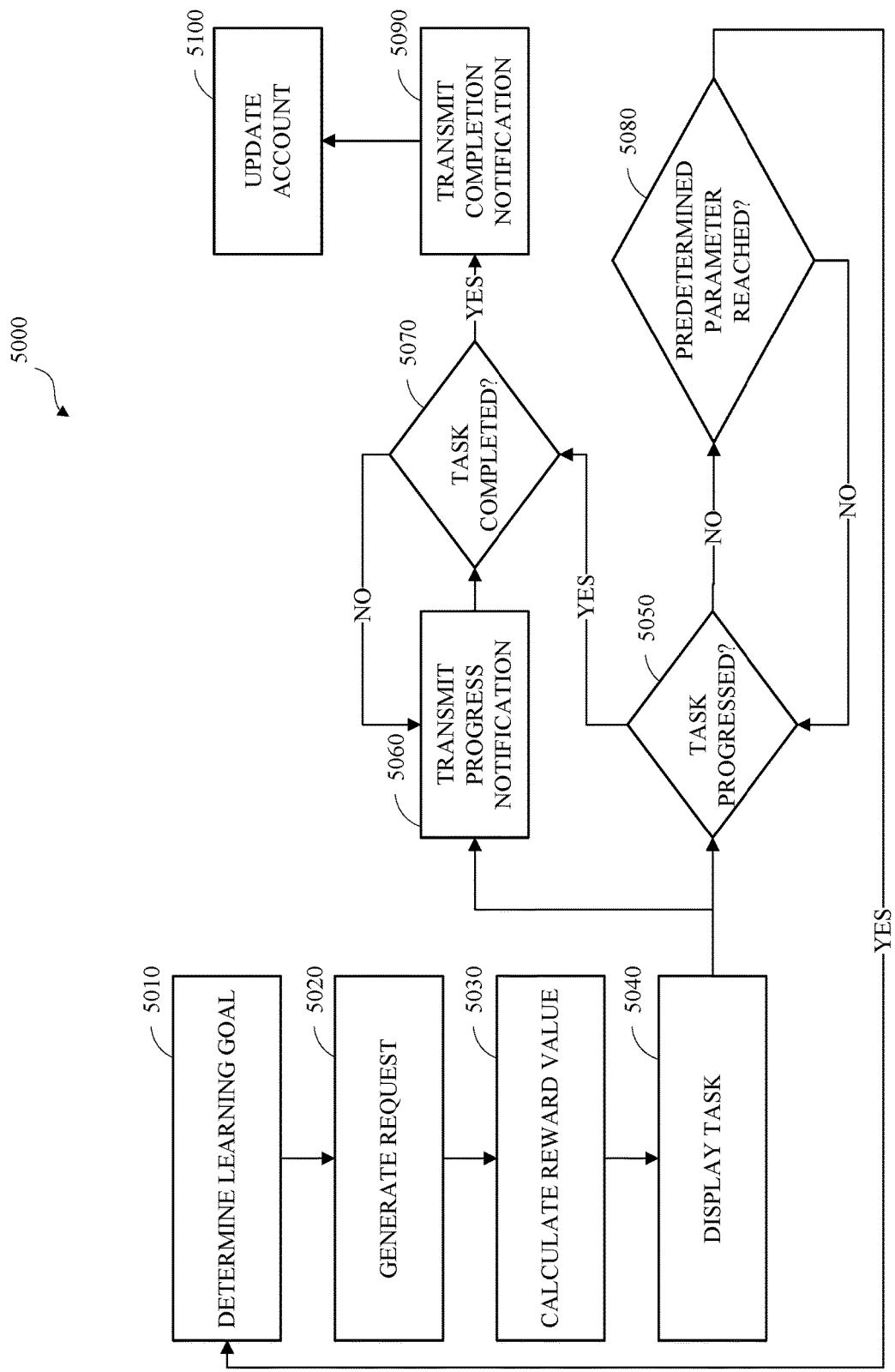
FIG. 5 is a flow diagram of another example of a gamification method for use accordance with embodiments of this disclosure.

FIG. 5 is a flow diagram of another example of a gamification method 5000 for use accordance with embodiments of this disclosure. The method 5000 may be performed by a vehicle such as vehicle 1000 shown in FIG. 1 or vehicles 2100 or 2110 shown in FIG. 2 using the gamification system 3000 shown in FIG. 3.

The method 5000 includes determining 5010 a learning goal. The learning goal may be based on incomplete or missing data that could be used to improve one or more AI subsystems of the vehicle. Example learning goals may be based on a navigation map to optimize power consumption, a lane topology and/or new driver behavior to optimize safety, an update to an SD map to build an HD map for improved autonomous driving capability, or any combination thereof. An example of a learning goal may be to obtain lane information, such as "Obtain lane lines on $2^{nd}$ Street." Another example of a learning goal may be to obtain a driver preference such as "Obtain driver acceleration preference."

The method 5000 includes generating 5020 a request. The request may be based on the learning goal. The request may be used to determine a task and calculate 5030 a reward value. The task may include a driving instruction, a number of repetitions, a duration of time, a battery consumption threshold, an ambient noise threshold, or any combination thereof. An example task to obtain lane information may include an instruction to perform a driving action a predetermined number of times, such as "Drive $2^{nd}$ Street three times." An example task to obtain a driver preference may include an instruction to perform a driving action a predetermined number of times, such as "Accelerate onto a highway 6 times." The reward value may be calculated based on a priority. For example, a learning goal based on safety may be assigned a higher priority, and therefore a higher point value than a learning goal based on battery consumption. In this example, the learning goal based on safety may be assigned 100 points, whereas a learning goal based on battery consumption may be assigned 50 points.

The method 5000 includes displaying 5040 the task, the reward value, or both, on a user interface, such as user interface 3020 shown in FIG. 3. The method 5000 includes determining 5050 whether the task has progressed based on obtained sensor data from one or more sensors, such as sensors 3030 shown in FIG. 3. In some examples, the method 5000 may include transmitting 5060 a progress notification based on the determined progress. In some examples, the method 5000 includes correlating the sensor data with the learning goal. If it is determined that the task has progressed, the method 5000 includes determining 5070 whether the task is complete. If it is determined that the task has not progressed, the method 5000 may include determining 5080 whether a predetermined parameter has been reached. The predetermined parameter may include a duration of time, a number of trip repetitions, a battery consumption threshold, a fuel consumption threshold, or an ambient noise threshold, or any combination thereof.

If the sensor data indicates that the task is complete, the method 5000 includes transmitting 5090 a completion notification and updating 5100 a user account to reflect the completed task. The completion notification, progress notification, or both, may be an audible alert, a visual alert, a haptic alert, or any combination thereof. In an example, a visual alert may be a text alert on the user interface of the vehicle, a graphical alert on the user interface of the vehicle, a change in a lighting condition of an interior of the vehicle, or any combination thereof. In another example, a haptic alert may include haptic feedback from a steering wheel of the vehicle, a seat of the vehicle, an accelerator pedal of the vehicle, a brake pedal of the vehicle, or any combination thereof. The notification may indicate that the task is complete, include the reward value, or both.

In an example where the learning goal is based on a navigation map, the method 5000 may include updating an AI subsystem of the vehicle based on the sensor data. Updating an AI subsystem of the vehicle may include, for example, updating a navigation map. In this example, updating the navigation map may include updating a traffic pattern, a traffic speed, a road topology, a lane topology, a battery consumption amount, a driver attribute, an ambient noise value, or any combination thereof.

Figure 6:
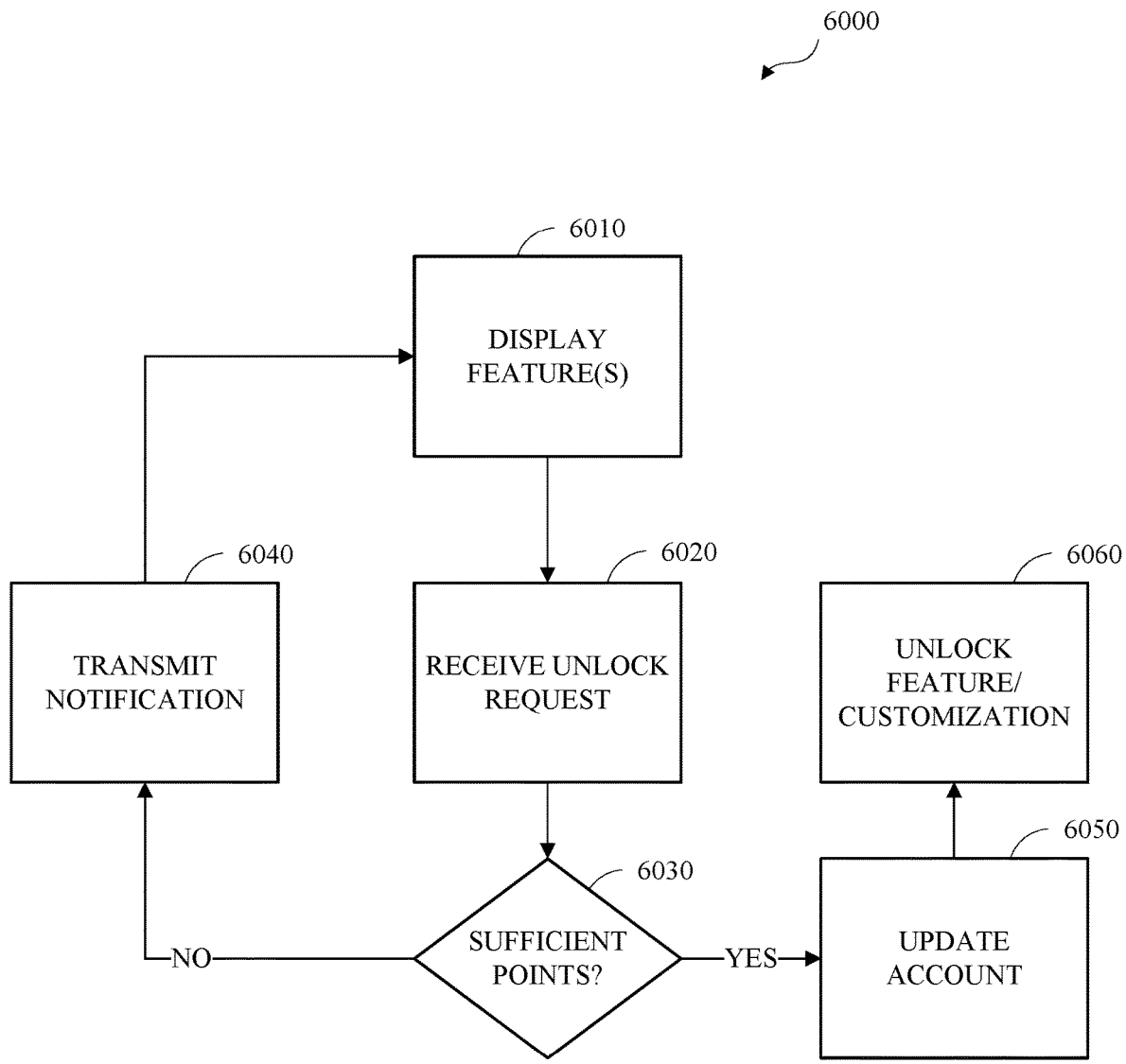
FIG. 6 is a flow diagram of an example of a method for unlocking a vehicle feature in accordance with embodiments of this disclosure.

FIG. 6 is a flow diagram of an example of a method 6000 for unlocking a vehicle feature in accordance with embodiments of this disclosure. The method 6000 may be performed by a vehicle such as vehicle 1000 shown in FIG. 1 or vehicles 2100 or 2110 shown in FIG. 2 using the gamification system 3000 shown in FIG. 3.

The method 6000 includes displaying 6010 one or more features to unlock. The one or more features may be displayed on a user interface, such as user interface 3020 shown in FIG. 3. The one or more features displayed may be based on a number of points stored in a user account, such as user account 3070 shown in FIG. 3. In some examples, the number of points may be displayed. A user may input an unlock request using a user interface, such as user interface 3020 shown in FIG. 3. The unlock request may include one or more selected features or customizations to unlock.

The method 6000 includes receiving 6020 the unlock request and determining 6030 whether the user account has sufficient points to unlock the one or more selected features or customizations. If it is determined that the user account does not have sufficient points to unlock the one or more selected features or customizations, the method 6000 includes transmitting 6040 a notification. The notification may indicate that the user account has insufficient points, suggests tasks to accumulate sufficient points, or both. The notification may be displayed on a display, such as user interface 3020 shown in FIG. 3. If it is determined that the user account has sufficient points to unlock the one or more selected features or customizations, the method 6000 includes updating 6050 the user account. Updating 6050 the user account may include reducing the number of points in the user account by the number of points needed to unlock the one or more features or customizations. The method includes unlocking 6060 the one or more features or customizations. The one or more features or customizations may be unlocked based on a confirmation that the user account has been updated.

As used herein, the terminology "instructions" may include directions or expressions for performing any method, or any portion or portions thereof, disclosed herein, and may be realized in hardware, software, or any combination thereof. For example, instructions may be implemented as information, such as a computer program, stored in memory that may be executed by a processor to perform any of the respective methods, algorithms, aspects, or combinations thereof, as described herein. In some embodiments, instructions, or a portion thereof, may be implemented as a special purpose processor, or circuitry, that may include specialized hardware for carrying out any of the methods, algorithms, aspects, or combinations thereof, as described herein. In some implementations, portions of the instructions may be distributed across multiple processors on a single device, on multiple devices, which may communicate directly or across a network such as a local area network, a wide area network, the Internet, or a combination thereof.

As used herein, the terminology "example", "embodiment", "implementation", "aspect", "feature", or "element" indicates serving as an example, instance, or illustration. Unless expressly indicated, any example, embodiment, implementation, aspect, feature, or element is independent of each other example, embodiment, implementation, aspect, feature, or element and may be used in combination with any other example, embodiment, implementation, aspect, feature, or element.

As used herein, the terminology "determine" and "identify", or any variations thereof, includes selecting, ascertaining, computing, looking up, receiving, determining, establishing, obtaining, or otherwise identifying or determining in any manner whatsoever using one or more of the devices shown and described herein.

As used herein, the terminology "or" is intended to mean an inclusive "or" rather than an exclusive "or". That is, unless specified otherwise, or clear from context, "X includes A or B" is intended to indicate any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form.

Further, for simplicity of explanation, although the figures and descriptions herein may include sequences or series of steps or stages, elements of the methods disclosed herein may occur in various orders or concurrently. Additionally, elements of the methods disclosed herein may occur with other elements not explicitly presented and described herein. Furthermore, not all elements of the methods described herein may be required to implement a method in accordance with this disclosure. Although aspects, features, and elements are described herein in particular combinations, each aspect, feature, or element may be used independently or in various combinations with or without other aspects, features, and elements.

The above-described aspects, examples, and implementations have been described in order to allow easy understanding of the disclosure are not limiting. On the contrary, the disclosure covers various modifications and equivalent arrangements included within the scope of the appended claims, which scope is to be accorded the broadest interpretation so as to encompass all such modifications and equivalent structure as is permitted under the law.

What is claimed is:

1. A method for use in a vehicle, the method comprising:
    determining, by an autonomous vehicle system, a learning goal for improving a standard definition navigation map of the autonomous vehicle system, wherein the learning goal is determined in real-time by the autonomous vehicle system based on an automated detection of incomplete or outdated data in the standard definition navigation map for a route currently being traversed by the vehicle;
    generating a request for targeted data collection based on the learning goal;
    calculating a reward value based on a priority and type of map deficiency;
    displaying a task on a user interface of the vehicle, wherein the task is based on the request and the reward value and is dynamically generated to address the map deficiency;
    obtaining sensor data based on an initiation of the task;
    determining progress of the task;
    transmitting a notification based on a determination that the task is completed; and
    updating the standard definition navigation map, based on the sensor data, to a high definition navigation map that includes a driver attribute for a predetermined route, wherein the update is performed automatically by the autonomous vehicle system and the driver attribute is derived from the sensor data associated with the completed task and the predetermined route.

2. The method of claim 1 further comprising:
    transmitting a progress notification based on the determined progress.

3. The method of claim 2, wherein the notification or the progress notification is an audible alert, a visual alert, or a haptic alert.

4. The method of claim 3, wherein the visual alert is a text alert on the user interface of the vehicle, a graphical alert on the user interface of the vehicle, or a change in a lighting condition of an interior of the vehicle.

5. The method of claim 3, wherein the haptic alert includes haptic feedback from a steering wheel of the vehicle, a seat of the vehicle, an accelerator pedal of the vehicle, or a brake pedal of the vehicle.

6. The method of claim 1 further comprising:
    correlating the sensor data with the learning goal.

7. The method of claim 1, wherein the standard definition navigation map is updated to improve autonomous driving capability.

8. The method of claim 7, wherein updating the standard definition navigation map to a high definition navigation map further includes updating a traffic pattern, a traffic speed, a road topology, a lane topology, or an ambient noise value.

9. The method of claim 1, wherein the reward value is based on the learning goal.

10. The method of claim 1, wherein the task includes a driving instruction, a number of repetitions, a duration of time, a battery consumption threshold, or an ambient noise threshold.

11. A vehicle comprising:
    a processor configured to:
        determine a learning goal for improving a standard definition navigation map of an autonomous vehicle system, wherein the learning goal is determined in real-time by the autonomous vehicle system based on an automated detection of incomplete or outdated data in the standard definition navigation map for a route currently being traversed by the vehicle;
        generate a request for targeted data collection based on the learning goal;
        calculate a reward value based on a priority and type of map deficiency;
    a user interface configured to display a task, wherein the task is based on the request and the reward value and is dynamically generated to address the map deficiency; and a sensor configured to obtain data based on an initiation of the task;

wherein the processor is further configured to:

determine progress of the task;

transmit a notification based on a determination that the task is completed; and update the standard definition navigation map, based on the obtained data from the sensor, to a high definition navigation map that includes a driver attribute amount for a predetermined route, wherein the update is performed automatically by the autonomous vehicle system and the driver attribute is derived from the sensor data associated with the completed task and the predetermined route.

12. The vehicle of claim 11, wherein the processor is further configured to transmit a progress notification based on the determined progress.

13. The vehicle of claim 12, wherein the notification or the progress notification is an audible alert, a visual alert, or a haptic alert.

14. The vehicle of claim 13, wherein the visual alert is a text alert on the user interface of the vehicle, a graphical alert on the user interface of the vehicle, or a change in a lighting condition of an interior of the vehicle.

15. The vehicle of claim 13, wherein the haptic alert includes haptic feedback from a steering wheel of the vehicle, a seat of the vehicle, an accelerator pedal of the vehicle, or a brake pedal of the vehicle.

16. The vehicle of claim 11, wherein the processor is further configured to correlate the sensor data with the learning goal.

17. The vehicle of claim 11, wherein the processor is further configured to update the standard definition navigation map to improve autonomous driving capability.

18. The vehicle of claim 17, wherein the processor is further configured to update a traffic pattern, a traffic speed, a road topology, a lane topology, or an ambient noise value of the standard definition navigation map.

19. The vehicle of claim 11, wherein the reward value is based on the learning goal.

20. The vehicle of claim 11, wherein the task includes a driving instruction, a number of repetitions, a duration of time, a battery consumption threshold, or an ambient noise threshold.

* * * * *